United States Patent
Jeong

(10) Patent No.: US 7,099,699 B2
(45) Date of Patent: Aug. 29, 2006

(54) METHOD FOR PREVENTING ILLEGAL USE OF MOBILE COMMUNICATION TERMINAL

(75) Inventor: Ho Joong Jeong, Seoul (KR)

(73) Assignee: LG Electronics Inc., Seoul (KR)

( * ) Notice: Subject to any disclaimer, the term of this patent is extended or adjusted under 35 U.S.C. 154(b) by 615 days.

(21) Appl. No.: 09/987,099

(22) Filed: Nov. 13, 2001

(65) Prior Publication Data

US 2002/0058497 A1    May 16, 2002

(30) Foreign Application Priority Data

Nov. 14, 2000   (KR)   ................................ 2000-67347
Dec. 21, 2000   (KR)   ................................ 2000-79884

(51) Int. Cl.
    *H04B 1/38*    (2006.01)
(52) U.S. Cl. ..................... 455/565; 455/557; 455/566; 455/551; 455/571; 455/572; 340/571; 340/653; 340/568; 340/825.44; 345/169; 345/158; 345/7; 345/2

(58) Field of Classification Search ................ 455/558, 455/411, 419, 410, 421, 414.3, 414.4, 551, 455/571, 572, 565, 566; 340/571, 653
See application file for complete search history.

(56) References Cited

U.S. PATENT DOCUMENTS 6,198,929 B1 *   3/2001   Krishnamurthi et al. ..... 455/439
6,289,214 B1 *   9/2001   Backstrom ................ 455/422.1
6,662,023 B1 *   12/2003  Helle ......................... 455/558

* cited by examiner

*Primary Examiner*—Joseph Feild
*Assistant Examiner*—Randy Peaches
(74) *Attorney, Agent, or Firm*—Fleshner & Kim, LLP

(57) ABSTRACT

A method for preventing an illegal use of a mobile communication terminal includes the steps of: transmitting a short message service (SMS) message to a lost terminal when a user requests a phone-locking service; and analyzing the received SMS message to set a phone-locking state for the lost terminal. When a terminal is lost, an SMS message containing a ciphered string is transmitted to the lost terminal to set a phone-locking or forcefully turn off an LCD power, so that the lost terminal can be prevented from illegally using by a third party or a stranger and user's personal information can be effectively prevented from leaking.

17 Claims, 2 Drawing Sheets

METHOD FOR PREVENTING ILLEGAL USE OF MOBILE COMMUNICATION TERMINAL

BACKGROUND OF THE INVENTION

1. Field of the Invention

The present invention relates to a mobile communication terminal, and more particularly, to a method for preventing illegal use of a mobile communication terminal by a third party or a stranger.

2. Description of the Background Art

These days, thanks to its portability and convenience, a mobile communication terminal (referred to as 'terminal', hereinafter) is used by lots of people. The terminal provides various additional functions such as an address, a phone number, an itinerary management or a memo for a user's convenience.

If the terminal is lost with the various additional function provided, the user information stored in the corresponding terminal would be exposed as it is to a stranger. In order to prevent an illegal use of the lost terminal by a stranger, currently, various restriction functions such as a phone-locking function are provided to the terminal.

First, the user sets a phone-locking menu through a user interface, inputs a lock code to set a phone-locking state for the terminal.

Once the phone-locking state is set, the terminal is put in a state that it can only receive a call. Thus, even though the corresponding terminal is lost, the terminal is prevented from illegally using by a stranger and leakage of the user's personal information can be prevented.

However, there has not been proposed any method for maintaining the user information and preventing an illegal use of a lost terminal by a stranger in case that a terminal is lost while its phone-locking function is not set.

Thus, in the past, if a terminal is lost while its phone-locking function is not set, there arises a problem that a stranger may use it illegally or leak the user information (an address, a phone number or a certain memo) stored in the terminal.

The above references are incorporated by reference herein where appropriate for appropriate teachings of additional or alternative details, features and/or technical background.

SUMMARY OF THE INVENTION

Therefore, an object of the present invention is to provide a method for preventing an illegal use of a mobile communication terminal that is capable of preventing or minimizing an illegal use of a lost terminal by a stranger from happening.

To achieve at least the above objects in whole or in parts, there is provided a method for preventing an illegal use of a mobile communication terminal including the steps of: transmitting a short message service (SMS) message to a lost terminal when a user requests a phone-locking service; and analyzing the SMS message by the lost terminal to set a phone-locking state or turn off a n LCD (liquid, crystal display) power.

To achieve at least these advantages in whole or in parts, there is further provided a method for preventing an illegal use of a mobile communication terminal including the steps of: transmitting an SMS message to a lost terminal when a user requests a phone-locking service; checking whether a string contained in the SMS message is a ciphered string; comparing the ciphered string with a pre-set string to discriminate a type of the ciphered string, if the corresponding string is the coded .string; and setting a phone-locking state for the lost terminal or turning off the LCD according to the discriminated type of the ciphered string.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENTS

The present invention is featured in that in case that a mobile communication terminal is lost in a state that its phone-locking function is not set, a short message service (SMS) message containing a ciphered string is transmitted to the lost terminal, to set a phone-locking state for the lost terminal or forcefully turn off an LCD power.

Figure 1:
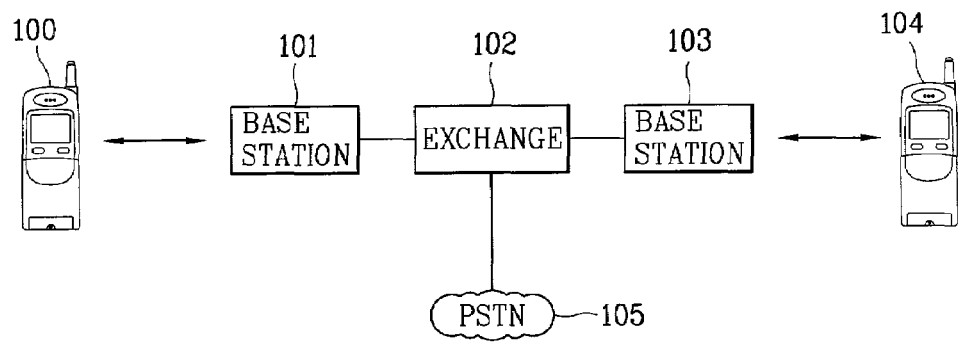
FIG. 1 is a schematic view of a mobile communication system adopted in the preferred embodiment of the present invention.

FIG. 1 is a schematic view of a mobile communication system adopted in the preferred embodiment of the present invention.

As shown in FIG. 1, when a terminal is lost, its user reports the loss of the terminal to an exchange 102, and at the same time, requests a phone-locking or an LCD power OFF service from the exchange 102 by using a terminal 100 or a public switched telephone network (PSTN) 105.

In response to the user's service request, the exchange 102 transmits an SMS message through a base station 103 to the lost terminal 104, and the lost terminal 104 analyzes the received SMS message to set a phone-locking function or turn off the LCD power.

The method for preventing an illegal use of a mobile communication terminal will now be described with reference to the accompanying drawings.

Figure 2:
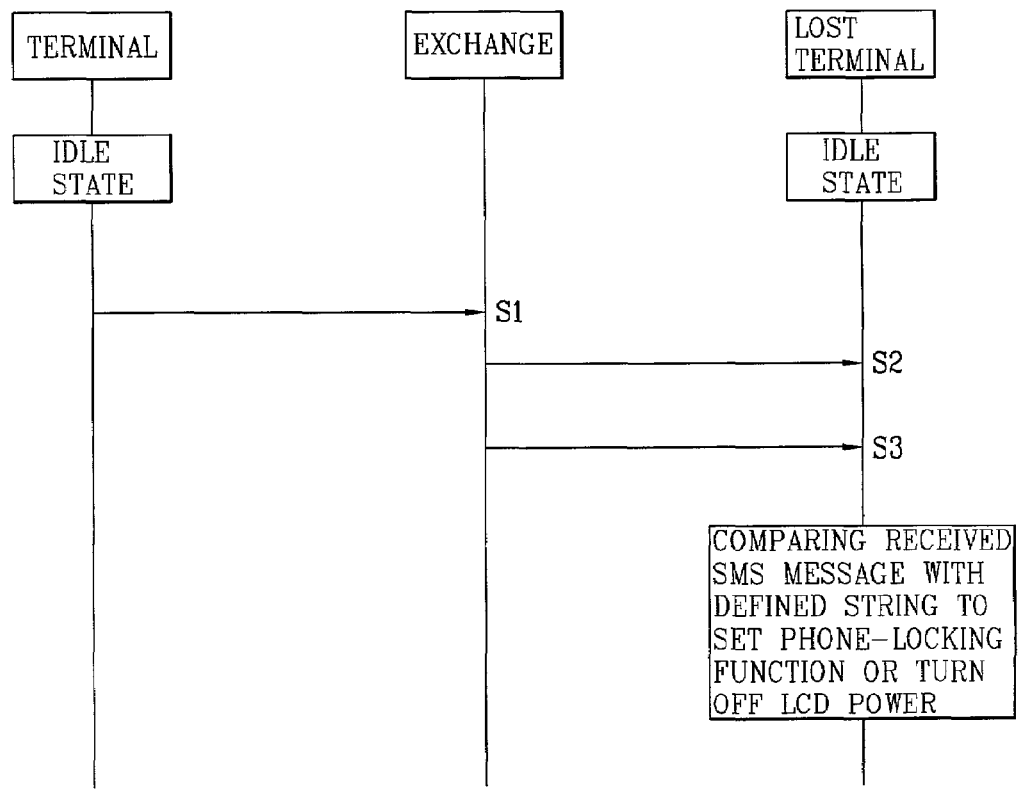
FIG. 2 is a drawing illustrating a call processing for setting a phone-locking state for a lost terminal or turning off an LCD power in accordance with the preferred embodiment of the present invention.

When the terminal is lost in a state that its phone-locking function is not set, as shown in FIG. 2, the user requests a phone-locking or an LCD power OFF service from the exchange 102 by using the terminal 100.

Figure 3:
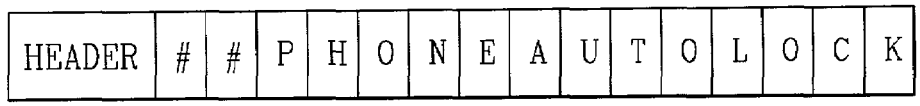
FIG. 3 is a drawing illustrating a format of an SMS message of FIG. 2 in accordance with the preferred embodiment of the present invention.

Upon receipt of the user's service request, as shown in FIG. 3, the exchange 102 contains a ciphered string (##phone auto lock) into the SMS message and transmits it to the lost terminal 104 (step S2).

As the SMS message is received through the base station 103 from the exchange 102, the lost terminal 104 transmits a response message (Ack Message) to the base station 103 to acknowledge receipt of the message (step S3), and analyzes the received SMS message to turn off the phone-locking function or the LCD power.

Figure 4:
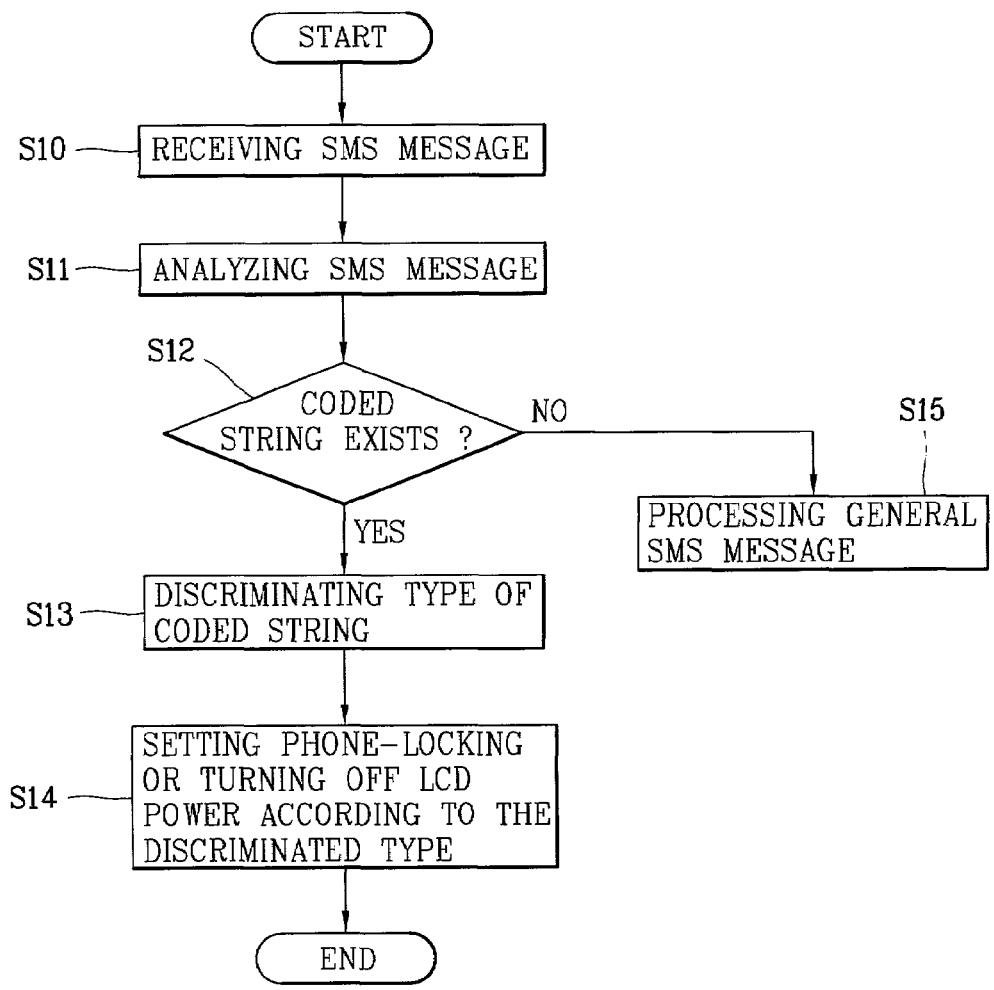
FIG. 4 is a flow chart of a method for preventing an illegal use of a mobile communication terminal in accordance with the preferred embodiment of the present invention.

In detail, as shown in FIG. 4, when the SMS message is received, a software of the lost terminal 104 analyzes the received SMS message and check whether a ciphered string exists in the SMS message (step S12). In this respect, the ciphered string is discriminated by '##' and a phone auto lock indicates a lock code or a power-OFF code.

If a ciphered string (##) is contained in the SMS message, the software discriminates whether the corresponding ciphered string is for a phone-locking use or for the LCD power-OFF use (step S13). The discrimination is made by comparing the code value (the lock code or the power-OFF code) of the received ciphered string and an internal string set by the user or an existing string.

If a string contained in the SMS message is not a ciphered string, the software performs a processing of a general SMS message likewise in the conventional art.

Once the type of the ciphered string is discriminated, the software of the lost terminal 104 drives a hardware according to the discriminated ciphered string type, to set a phone-locking function or turn off the LCD power (step S14).

For example, in the step S13, if the ciphered string is for a phone-locking use, the software reads a lock code for setting a phone-locking from a non-volatile memory (not shown). And then, the software enables a variable value for setting a phone-locking, sets other related codes and sets a phone-locking for the lost terminal 104. And then, the software finally displays the phone-locking state on the LCD screen.

Accordingly, so long as the stranger is not aware of the lock code, he or she may not use the lost terminal 104 or leak the user's personal information.

In the step S13, if the ciphered string is for the LCD power-OFF use, the software disables a regulator drive signal outputted to a general purpose input/output (GPIO) port of a mobile station modem (MSM) (not shown) and enables its related data variable of a non-volatile memory. The variable is to prevent the power of the LCD to be driven when the power is again turned on. Resultantly, a regulator (not shown) which supplies the LCD power (Vcc) according to the drive signal is disabled, so that the power supply (Vcc) to the LCD is cut off.

Accordingly, though the lost terminal is turned on, since the screen of the LCD is turned off, the stranger may not read or leak the user's personal information stored in the lost terminal 104.

Thereafter, when the user gets back the lost terminal 104, he or she can re-operate the OFF LCD by inputting a string of '##LCDON' and clearing again the data of the non-volatile memory.

As so far described, the method for preventing illegal use of a mobile communication terminal has the advantage that, when a terminal is lost, an SMS message containing a ciphered string is transmitted to the lost terminal to set a phone-locking or forcefully turn off an LCD power, so that the lost terminal can be prevented from illegally using by a third party or a stranger and user's personal information can be effectively prevented from leaking.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A method for preventing use of a mobile communication terminal comprising:
    transmitting a short message service (SMS) message to the mobile communication terminal when a user requests a phone-locking service;
    receiving the SMS message at the mobile communication terminal; and
    analyzing the received SMS message to set a phone-locking state for the mobile communication terminal by turning off a display power;
    wherein the display power off state setting comprises:
    controlling a GPIO port of an mobile station modem and cutting off power applied to the display; and
    converting a data variable of a memory as the applied power is cut off to prevent the power to the display when power to the terminal is subsequently provided.

2. The method of claim 1, wherein the SMS message includes a header and a ciphered string.

3. The method of claim 1, wherein the phone-locking function comprises:
    checking whether a ciphered string is contained in the received SMS message;
    discriminating a type of the ciphered string; and
    setting the mobile communication terminal to a phone-locking state, if the ciphered string is for a phone-locking state.

4. A method for preventing use of a mobile communication terminal comprising:
    transmitting an SMS message to the mobile communication terminal from an exchange when a phone-locking service is requested;
    receiving the SMS message at the mobile communication terminal;
    analyzing the received SMS message and turning off a display power by the mobile communication terminal; and
    storing an indication to keep the display power off while maintaining power to remaining portions of the mobile communication terminal;
    wherein the display power off state setting comprises:
    controlling a GPIO port of a MSM and cutting off power applied to the display; and
    converting a data variable of a memory as the applied power is cut off to prevent the power to the display when power to the terminal is subsequently provided.

5. The method of claim 4, wherein the SMS message includes a header and a ciphered string.

6. The method of claim 4, wherein the display power turning off step comprises:
    checking whether a ciphered string exists in the SMS message;
    discriminating a type of the ciphered string contained in the SMS message; and
    turning off the display power, if the type of the ciphered string is for a display power off use.

7. A method for preventing use of a mobile communication terminal comprising:
    a first step in which when a user requests a phone-locking service, an SMS message is transmitted to the mobile communication terminal; and a second step in which the received SMS message is analyzed to set a phone lock function by a display power off function, wherein the display power off setting comprises:
  controlling a general purpose input/output (GPIO) port of a mobile station modem (MSM) and cutting off power to the display, and
  converting a data variable of a memory to prevent the power to the display when power to the terminal is subsequently provided.

8. The method of claim 7, wherein the SMS message includes a header and a ciphered string.

9. The method of claim 7, where the second step comprises:
  checking whether a ciphered string is contained in the SMS message;
  discriminating a type of the ciphered string contained in the SMS message; and
  setting a phone-lock function or display power off function according to the discriminated ciphered string type.

10. The method of claim 9, wherein the phone-lock function setting comprises:
  reading a lock code if the ciphered string is for a phone-lock function;
  enabling a variable value for the phone-lock function; and
  setting the phone-lock function based on the read lock code and displaying the phone-lock function on the mobile communication terminal.

11. The method of claim 9, wherein, if no ciphered string is contained in the SMS message, a general SMS message processing is performed.

12. A method for preventing use of a mobile communication terminal comprising:
  receiving an SMS message from a base station;
  checking whether a ciphered string exists in the received SMS message;
  discriminating a type of the ciphered string if a ciphered string exists in the SMS message, and processing a general SMS message if a ciphered string does not exist in the received SMS message; and
  setting a phone-locking state or turning off a display power off state for the mobile communication terminal according to the discriminated ciphered string type, wherein the display power off state setting comprises:
    cutting off power applied to the display, and controlling a GPIO port of an MSM;
    converting a data variable of a memory as the applied power is cut off to prevent the power to the display when power to the terminal is subsequently provided.

13. The method of claim 12, wherein the SMS message includes a header and a ciphered string.

14. The method of claim 12, wherein the phone-locking state setting comprises:
  reading a lock code from the memory if a ciphered string is for the phone-locking state;
  enabling a variable value for the phone-locking state; and
  setting the phone-locking state on the basis of the read lock code and displaying the phone-locking state on the mobile communication terminal.

15. An apparatus for preventing use of a mobile communication terminal, comprising:
  receiving means for receiving an SMS message from a base station;
  checking means for checking whether a ciphered string exists in a received SMS message;
  discriminating means for discriminating a type of the ciphered string if a ciphered string exists in the SMS message, and processing a general SMS message if a ciphered string does not exist in the received SMS message;
  setting means for setting a phone-locking state using a display power off state for the mobile communication terminal according to the discriminated ciphered string type; and
  storing means for storing an indication to keep the display power off while maintaining power to remaining portion of the mobile communication terminal in the display power off state, wherein the setting means includes control means for controlling a GPIO port of a MSM.

16. The apparatus of claim 15, wherein the received message includes a ciphered string.

17. The apparatus of claim 15, comprising:
  means for controlling a GPIO portion of a mobile station modem and cutting off power applied to the display; and
  means for converting a data variable of a memory as the applied power is cut off to prevent the power to the display when power to the terminal is subsequently provided.

* * * * *